United States Patent [19]

König et al.

[11] Patent Number: 5,356,120
[45] Date of Patent: Oct. 18, 1994

[54] DEVICE FOR PRODUCING FINELY-DIVIDED METAL AND CERAMIC POWDER

[75] Inventors: Theo König, Laufenburg-Rotzel; Kurt Bächle, Murg; Falk Stein, Murg-Oberhof; Horst Ewel, Murg; Volker Rose, Laufenburg; Gerd Zippenfenig, Murg; Roland Klafki, Grafenhausen, all of Fed. Rep. of Germany

[73] Assignee: H. C. Starck, Gmbh and Co. KG., Goslar, Fed. Rep. of Germany

[21] Appl. No.: 51,836

[22] Filed: Apr. 26, 1993

[30] Foreign Application Priority Data

May 4, 1992 [DE] Fed. Rep. of Germany ....... 4214720

[51] Int. Cl.$^5$ .............................................. B22F 9/00
[52] U.S. Cl. ...................................... 266/175; 266/202
[58] Field of Search ...................... 266/172, 175, 202; 75/367, 343, 355

[56] References Cited

U.S. PATENT DOCUMENTS

| | | | |
|---|---|---|---|
| 4,383,852 | 5/1983 | Yoshizawa | 75/0.5 B |
| 4,484,943 | 11/1984 | Miura et al. | 75/0.5 B |
| 4,533,383 | 8/1985 | Miura et al. | 75/367 |
| 4,556,416 | 12/1985 | Kamijo et al. | 75/0.5 B |
| 4,617,055 | 10/1986 | Miura et al. | 75/367 |
| 4,642,207 | 2/1987 | Uda et al. | 264/10 |
| 4,689,075 | 8/1987 | Uda et al. | 75/0.5 B |
| 4,994,107 | 2/1991 | Flagan et al. | 75/367 |
| 5,073,193 | 12/1991 | Chaklader et al. | 75/346 |

FOREIGN PATENT DOCUMENTS

| | | |
|---|---|---|
| 0151490 | 8/1985 | European Pat. Off. . |
| 0152957 | 8/1985 | European Pat. Off. . |
| 0290177 | 11/1988 | European Pat. Off. . |
| 0379910 | 8/1990 | European Pat. Off. . |

OTHER PUBLICATIONS

G. W. Elger, D. E. Traut, G. J. Slavens, and S. J. Gerdemann: *Metallurgical Transactions B*, "Preparation of Submicron Titanium Nitride Powder by Vapor-Phase Reactions", Aug. 1989, vol. 20B, pp. 493–497.

*Primary Examiner*—Scott Kastler
*Attorney, Agent, or Firm*—Connolly & Hutz

[57] ABSTRACT

The invention relates to a gas phase reactor for producing finely divided metal and/or ceramic powder and comprising a gas preheater, a gas-introducing part, a flow-shaping part, a reaction tube and a product discharge device.

6 Claims, 4 Drawing Sheets

DEVICE FOR PRODUCING FINELY-DIVIDED METAL AND CERAMIC POWDER

The invention relates to a gas phase reactor for producing finely-divided metal and/or ceramic powder, comprising a gas preheater, a gas-introduction part, a flow-shaping part, a reaction tube and a product discharge device.

The mechanical properties of components made by powder metallurgy or from powdered ceramics are critically affected by the properties of the initial powder. More particularly, a narrow particle-size distribution, high purity of powder and absence of coarse particles or agglomerates have an advantageous effect on the properties of the components.

There are numerous known devices and methods for industrial production of fine metal and ceramic powders.

In addition to the purely mechanical crushing and grading processes, which have the disadvantage of being able to produce powder only up to a certain fineness and with a relatively wide particle distribution, there are also a number of proposed methods and devices for separation from the gas phase.

Since some of the energy sources, e.g. a thermal plasma or laser beam, have very small energy, or if the flames are turbulent. e.g. in the case of a chlorine and oxyhydrogen gas burner, the particle distribution and particle size of the resulting powder cannot be exactly controlled, and usually the reaction conditions result in a wide particle distribution and in individual particles having a diameter many times the average particle size.

In present known large-scale industrial methods of manufacturing powder, it is very difficult or impossible to produce powder having average particle sizes less than 0.5 $\mu$m, measured to FSSS (not individual particle size). It is practically impossible to prevent these conventionally-produced fine powders from containing a certain percentage of coarse particles which adversely affect the mechanical properties of the components made therefrom. Also, conventional grinding results in a very wide particle distribution, which in the case of these powders cannot be substantially reduced even by screening.

Hitherto-known methods mad devices for producing very fine powders via the gas phase are sometimes in two stages, the second stage being for the purpose of converting the relatively amorphous intermediate product into crystalline form and removing undesired by-products from the reaction.

Other gas phase processes do not use a hot-wall reactor optimised as regards flow, but use a plasma flame or other energy sources such as laser beams for the process. The main disadvantages of these methods and devices are that in practice the reaction conditions in various regions of the reaction zone cannot be controlled and there are very wide temperature gradients and/or turbulent flows, resulting in powder having a wide particle distribution.

Numerous proposals have been made as regards methods and devices for producing very fine powdered hard material and very fine metal powders, but they all have disadvantages. For example US-A 4 994 107 discloses a process in which a tubular reactor is used to produce uniform non- agglomerated powder, but even this has considerable disadvantages in practice. Since all the reactants are mixed before the hot zone, there is no defined beginning of the nucleation reaction, and reactions at the wall cannot be prevented. There is therefore a risk that large particles will enter the otherwise fine powder and be impossible to remove.

EP-A 0 379 910 describes a two-stage process for producing $Si_3N_4$ from the gas phase, in which the starting halide in liquid form is blown through a two-material nozzle into the reactor chamber. This method also is incapable of producing a satisfactory powder.

It has also been proposed to produce very fine uniform powder by reaction at negative pressure or by various sol-gel processes. These proposals also have disadvantages, such as a number of stages, or difficulty in controlling the particle size, particle distribution and batch operation.

The proposed plasma, laser or explosion processes (EP-A 0 152 957, EP-A 0 151 490) also have the aforementioned disadvantages.

Another proposal (EP-A 0 290 177) relates to carbonyl decomposition for producing fine metal powders.

Even fine powders produced by specially-guided magnesiothermic reaction of the corresponding metal chlorides, e.g. to produce TiN or TiC, do not reach the fineness and uniformity of the powders produced by the proposed method (G. W. Elger, Met. Transactions 20 B, 8, 1989, pages 493–497).

Likewise the processes and devices disclosed in US-A 4 642 207, US-A 4 689 075, EP-A 152 957 and EP-A 151 490, in which the metal is vaporised by an electric-arc or electron beam and by reaction of gaseous reactants in a flow discharge, do not meet the requirements of an economic process for producing very uniform fine powders.

The aim of the invention therefore is to provide a device for producing finely-divided metal and ceramic powders without the aforementioned disadvantages of the prior-art devices.

A device which meets these requirements has now been found. The device is the subject of this invention.

It relates to a gas phase reactor for producing finely-divided metal and/or ceramic powder, comprising a gas preheater (23), a gas-introduction part (24), a flow-shaping part (25), a reaction tube (4) and a product discharge device (26) characterised in that the gas preheater comprises at least two separate gas heaters.

In the gas phase reactor according to the invention, finely-divided metal and/or ceramic powder can be reacted by a reaction between suitable metal compounds and suitable reactants, and the metal compounds and the reactants can be introduced into the reactor, at at least the reaction temperature, separately from one another in the gas heaters according to the invention. This is a method of limiting the area in which nucleation occurs.

The metal compounds according to the invention may more particularly be one or more from the group $BCl_3$, boric acid esters, boran $SiCl_4$, other chlorosilanes, silanes, metal halides, partly hydrogenated metal halides, metal hydrides, metal alcoholates, metal alkyls, metal amides, metal azides, metal boranates and metal carbonyls.

The other reactants may more particularly be one or more from the group $H_2$, $NH_3$, hydrazine, amines, $CH_4$, other alkanes, alkenes, alkines, aryls, $O_2$, air, $BCl_3$, boric acid esters, boranes, $SiCl_4$, other chlorosilanes and silanes.

In a preferred embodiment of the device according to the invention, an evaporator is connected upstream of one or more of the gas heaters. Particularly preferably, the evaporator or evaporators are incorporated in the gas preheater. This avoids the need for feed pipes outside the reactor, thus avoiding corrosion and resulting impurities. In addition, the temperature can be more accurately guided.

Consequently, the same active substances can be used as in the reactor itself. It is not necessary to use metals for the feed lines as in the prior art. This eliminates a possible source of impurity. It is also possible to obtain evaporation temperatures which are beyond the temperatures for which metal materials are designed. It is thus possible to produce finely-divided metal and ceramic powder based e.g. on iron, chromium, nickel and cobalt.

Preferably the flow-shaping part according to the invention comprises at least two reaction-gas nozzles, which particularly preferably are coaxial with one another.

In this manner the metal compounds and the reactants can be introduced in the form of coaxial laminar component flows into the reactor.

The laminar flow in the reactor ensures a narrow distribution of residence times of the nuclei or particles. This is a way of achieving a very narrow particle-size distribution. To prevent deposits on the reaction-gas nozzles, the reactants can be separated by a flow of inert gas.

In another advantageous embodiment of the device according to the invention, therefore, an inert gas nozzle is disposed between the reaction nozzles, preferably coaxially therewith.

In order to ensure thorough mixing of the two coaxial partial flows, an obstacle can be incorporated in the otherwise strictly laminar flow, so as to generate a Kármán vortex path, which varies in intensity and extent.

In a preferred embodiment of the device according to the invention, an obstacle for generating a Kármán vortex path is disposed in the flow-shaping part, preferably along the longitudinal axis of the central coaxial nozzle.

To prevent the reactants being deposited on the reactor wall, to which there is a strong bias owing to the energy situation, the reaction medium is preferably screened from the reactor wall by an inert gas layer supplied by gas-introducing devices.

The screening of the reactor wall with inert gas is even more effective, the greater the reduction of the formation of microvortices, which automatically occur on the reactor wall. In addition to the use of a minimum depth of score, longitudinal micro-grooves can used (as in aircraft construction) for the suppression of vortices.

In a preferred embodiment, therefore, in the case of the device according to the invention, one or more gas-introducing devices, particularly preferably annular gaps, are disposed in the reaction tube.

Accordingly an inert gas flow can be introduced through the specially-shaped annular gaps in the reactor wall, to which it clings owing to the Coanda effect. The metal or ceramic powder particles formed in the reactor by homogeneous deposition from the gas phase, during typical residence times between 10 and 300 msec, leave the reactor together with the gaseous reaction products (e.g. HCl), the unreacted substances and the inert gases, which are blown in to serve as carrier gases, scavenging gases and to reduce the HCl adsorption. The device according to the invention can give yields of up to 100% relative to the metal component.

Preferably the metal or ceramic powder can be separated at temperatures above the boiling or sublimation temperatures of the metal compounds, reactants and/or by-products inevitably produced during the reaction. Advantageously, separation can be brought about in a back-blowing filter. If the filter is operated at high temperatures, e.g. 600° C., the adsorption of gases, particularly of non-inert gases such as HCl, $NH_3$ or $TiCl_4$ on the very large surface area of the ceramic or metal powder, can be kept low. More particularly, the formation of $NH_4Cl$ is prevented during the production of nitrides (above 350° C.).

The remaining interfering substances adsorbed on the powder surfaces can be additionally removed in a downstream vacuum container, preferably at temperatures of about 600° C. as before. The finished powders can then be discharged from the plant with exclusion of air.

The device according to the invention can produce nano- or micro-dispersed (crystalline or amorphous) metal and/or ceramic powders, preferably metal and-/or ceramic powder, carbides, nitrides, borides, silicides, phosphites, sulphides, oxides and/or combinations thereof containing the elements B, Al, Si, Ti, Zr, Hf, V, Nb, Ta, Cr, Mo, W, La, Y, Fe, Co, Ni or these elements alone or in combination with one another.

The device according to the invention can be used to produce metal and ceramic powders having an adjustable particle size between 3 and 3000 mn (3 $\mu$m) and an extremely narrow particle size distribution. A characteristic of the resulting particles is the complete absence of any substantially greater than the average size. For example, the powders produced in the device according to the invention usually have less than 1% of individual particles deviating by more than 20% from the average size. There are no particles which deviate by more than 50%.

The non-oxide powders also have a low oxygen content (less than 1000 ppm). The powders are also characterised by high purity, high surface purity and good reproducibility.

Depending on the particle size and material, the non-oxide powder may be very sensitive to air or may be pyrophoric. To counteract this property, these powders can be surface-modified in defined manner by treatment with gas/vapour mixtures.

BRIEF DESCRIPTION OF THE DRAWINGS

FIG. 1 is a diagram of a possible embodiment of the device according to the invention, which will be explained hereinafter with reference thereto. The explicitly mentioned process, material and/or device parameters are only selected possibilities out of many and do not therefore restrict the invention.

Figure 1:
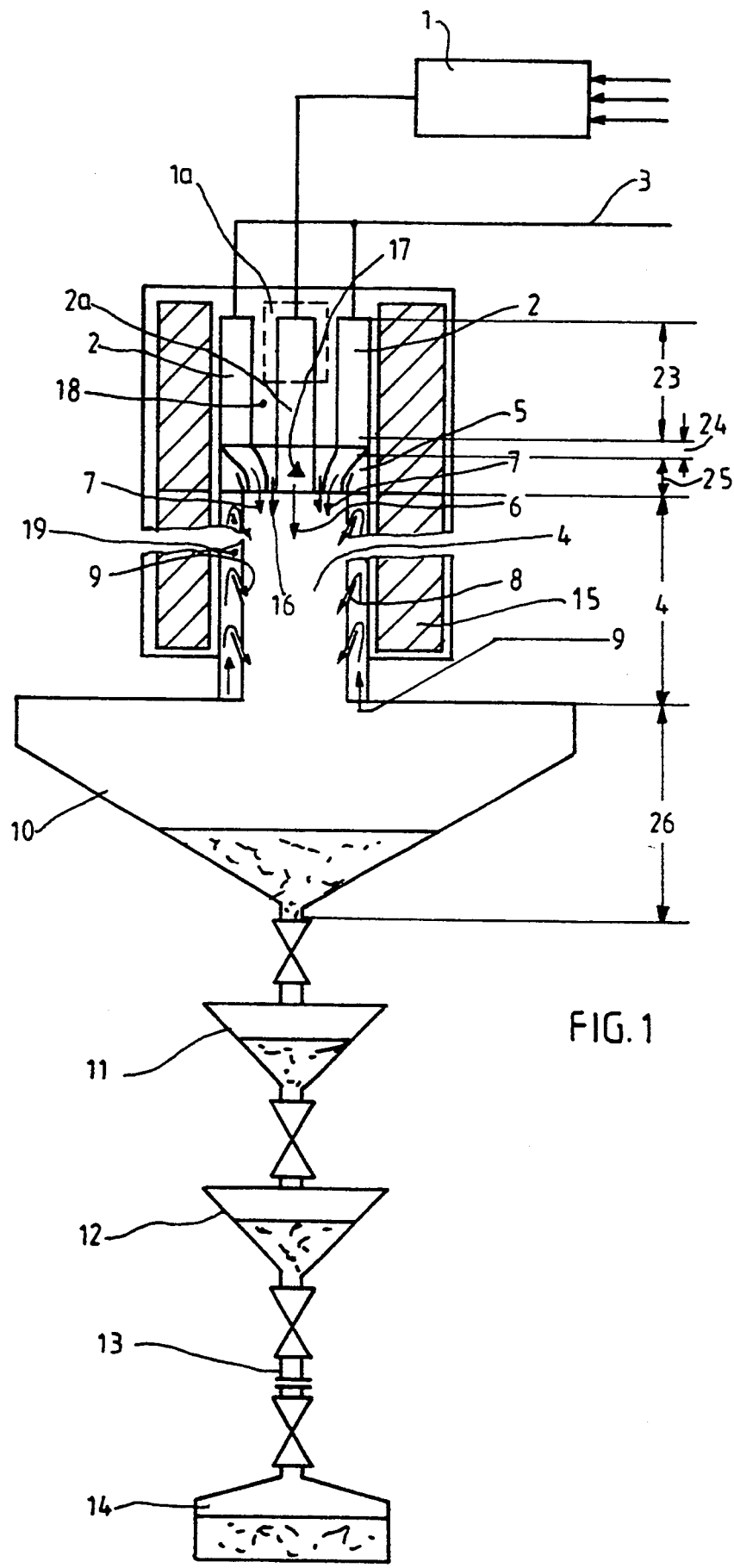
FIG. 1 is a diagram of one embodiment of the invention

The solid, liquid or gaseous metal compounds are supplied in metered manner to an external evaporator 1, or to an evaporator I a disposed inside the high-temperature furnace, where they are evaporated at temperatures of 200° C. to 2000° C. and conveyed by an inert carrier gas ($N_2$, Ar or He) into a gas preheater 2a. Higher evaporation temperatures can be obtained inside the high-temperature furnace. Since better materials can be used, the products have a lower level of impurities. The other reactants 3, such as $H_2$, $NH_3$ or $CH_4$, or the air and/or oxygen for producing metal oxides, are also heated in a gas preheater 2. Both gas mixtures are chosen so that during the heating-up process no reaction leading to solid products occurs. Before entering the tubular reactor 4, the turbulent individual filaments of flow coming out of the gas preheaters 2 are shaped in a nozzle 5 to form two coaxial laminar, axially symmetrical filaments. In the tubular reactor 4, the middle filament 6 containing the metal components becomes thoroughly mixed with the surrounding filaments 7 containing the remaining reactants, trader defined conditions. The reaction occurs at temperatures between 500° C. and 2000° C., e.g. in accordance with the following examples:

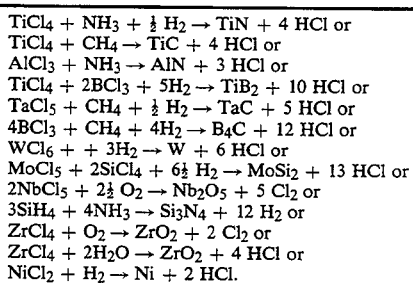

$TiCl_4 + NH_3 + \frac{1}{2} H_2 \rightarrow TiN + 4 HCl$ or
$TiCl_4 + CH_4 \rightarrow TiC + 4 HCl$ or
$AlCl_3 + NH_3 \rightarrow AlN + 3 HCl$ or
$TiCl_4 + 2BCl_3 + 5H_2 \rightarrow TiB_2 + 10 HCl$ or
$TaCl_5 + CH_4 + \frac{1}{2} H_2 \rightarrow TaC + 5 HCl$ or
$4BCl_3 + CH_4 + 4H_2 \rightarrow B_4C + 12 HCl$ or
$WCl_6 + + 3H_2 \rightarrow W + 6 HCl$ or
$MoCl_5 + 2SiCl_4 + 6\frac{1}{2} H_2 \rightarrow MoSi_2 + 13 HCl$ or
$2NbCl_5 + 2\frac{1}{2} O_2 \rightarrow Nb_2O_5 + 5 Cl_2$ or
$3SiH_4 + 4NH_3 \rightarrow Si_3N_4 + 12 H_2$ or
$ZrCl_4 + O_2 \rightarrow ZrO_2 + 2 Cl_2$ or
$ZrCl_4 + 2H_2O \rightarrow ZrO_2 + 4 HCl$ or
$NiCl_2 + H_2 \rightarrow Ni + 2 HCl$.

In order to mix thoroughly the two coaxial filaments of flow, an obstacle 17 can be incorporated in the otherwise strictly laminar flow to produce a Kármán vortex path. The two coaxial filaments at the nozzle outlet are separated by a weak stream of inert gas 16, to prevent deposits on the nozzle 5.

Figures 2, 2A:
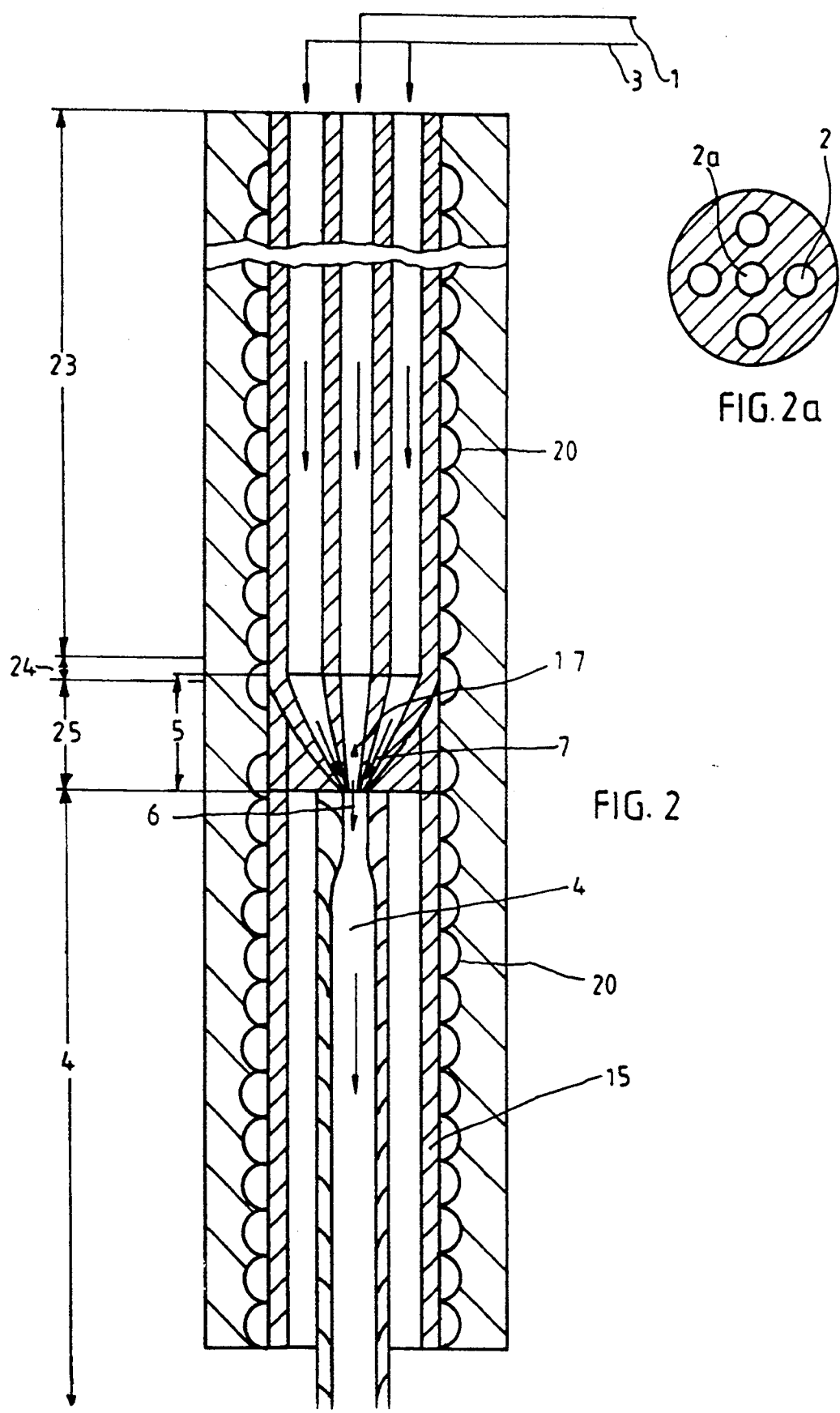
FIG. 2 shows the beginning of the device according to the invention
FIG. 2a shows a cross section through the gas introducing part.

FIG. 2 shows the beginning of the device according to the invention, beginning with the gas preheater 23 and comprising the gas introducing part 24, the flow-shaping part 25 and the reaction tube 4. Preferably a heating system 20 is disposed so that a number of heating zones can optionally be provided for controlling the particle size. Preferably the heating zones are independently adjustable, for improved adjustment of the temperature profile along the reactor axis.

The nozzle 5 must be adapted to produce a homogeneous laminar, axially symmetrical annular flow out of the separate turbulent flow filaments from the outer heat exchangers 2. Secondly, it must be adapted to convert the turbulent filaments from the central heat exchanger 2a into a laminar flow and introduce it into the outer annular filaments.

FIG. 2a shows a possible cross-section through the gas- introducing part.

Figure 3:
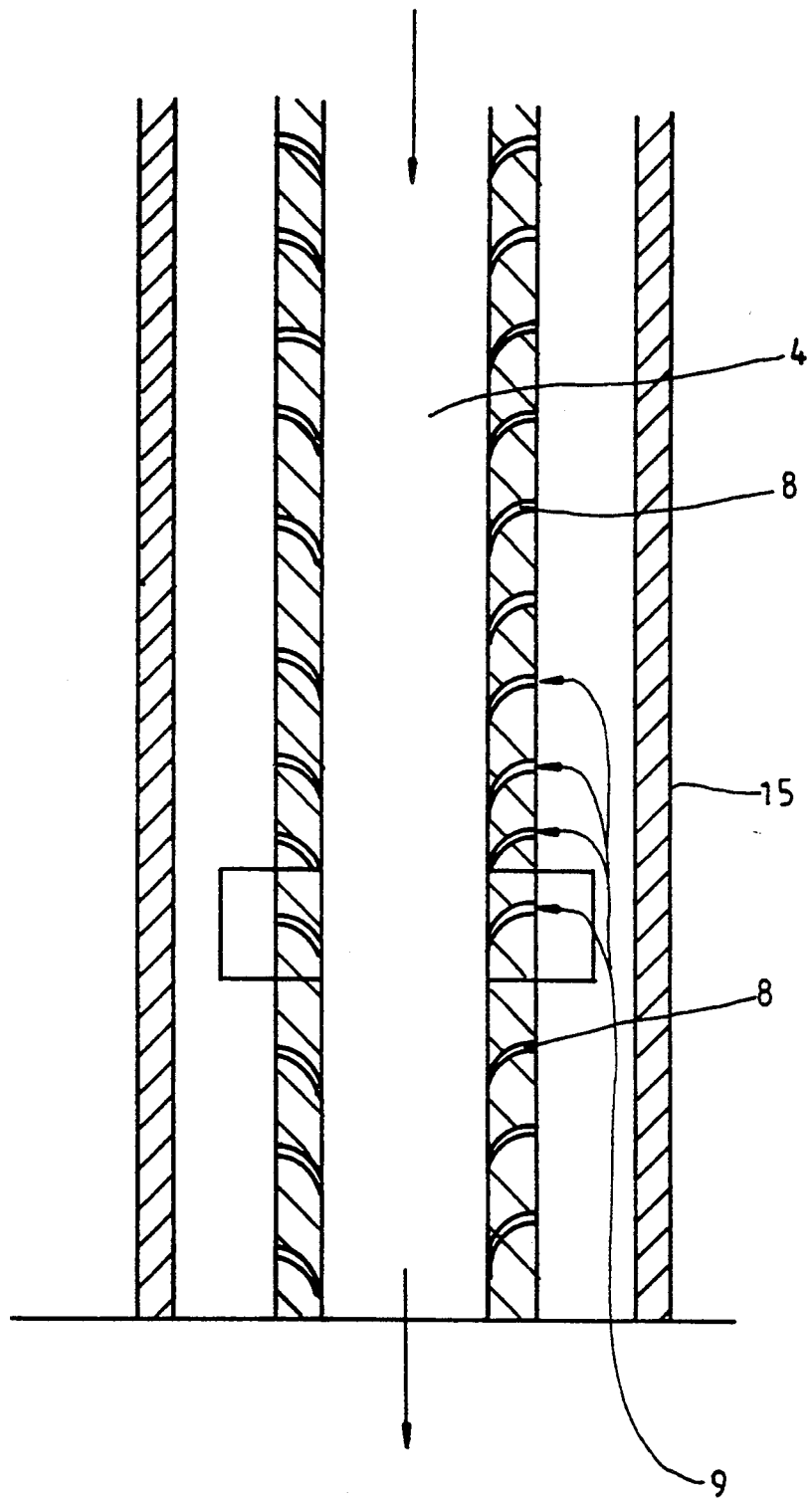
FIG. 3 is a diagram of part of the reactor tube

To prevent heterogeneous deposition of these substances on the hot reactor wall, to which there is a strong bias owing to the energy conditions, the wall is scavenged through annular gaps 8 by a stream of inert gas 9 ($N_2$, Ar or He), which keeps close to the reactor wall owing to the Coanda effect. FIG. 3 is a diagram of part of the reactor tube 4. In FIG. 3 the stream of inert gas 9 is conveyed between the reactor wall and the reactor encasing tube 15. The ceramic powder particles, which are produced in the reactor through homogeneous deposition from the gas phase, leave the reactor together with the gaseous reaction products (e.g. HCl) and the unreacted substances and directly enter a blow-back filter 10 in which they are deposited. The filter 10 is operated at temperatures between 300° C. and 1000° C., thus reducing the level of adsorption of gases, particularly non-inert gases such as HCl, $NH_3$ and $TiCl_4$, on the very large surface area of the powder. This also prevents the formation of $NH_4Cl$ from excess $NH_3$ (during the manufacture of metal nitrides) and HCl. In an adjacent container 11, the remaining adsorbed gases on the powders are further reduced, preferably by alternate application of negative pressure and flooding with various gases at 300° C. to 1000° C. Good effects are obtained by using gases such as $N_2$, Ar or Kr. $SF_6$ is particularly preferred.

The device according to the invention can also be used for producing metastable systems of substances and particles with core/shell structures. Metastable systems of substances are obtained by setting very high cooling rates in the lower part of the reactor.

Particles having a core/shell structure are obtained by introducing additional reaction gases into the lower part of the reactor.

After leaving the evacuation container 11, the particles enter the cooling container 12 before travelling through a lock 13 into the collecting and despatch container 14. In the cooling container 12, the particle surfaces can be modified in defined manner by blowing in various gas/vapour mixtures.

Components exposed to temperatures of 2000° C. or more, e.g. the heat exchangers 2 and 3, the nozzle 5, the reactor 4 and the reactor-encasing tube 15, are preferably made of coated graphite, more particularly fine particulate graphite. Coating may be necessary if the graphite does not have the required chemical resistance to the gases used, e.g. metal chlorides, HCl, $H_2$, $NH_3$, $N_2$ and $O_2$, at the given temperatures, or if erosion at higher flow speeds (0.5 to 50 m/sec) is very considerable or if the gas-tightness of the graphite can be increased thereby or if the surface roughness of the reactor components can be reduced.

The coming can be e.g. of SiC, $B_4C$, TiN, TiC, $Al_2O_3$, $Ta_2O_3$ or Ni (only up to 1200° C.). Combinations of various layers, e.g. with a "special" surface layer, are also possible. The coatings may advantageously be applied by CVD, plasma spraying or electrolysis (Ni).

Oxide ceramic materials are suitable for producing the oxides for these parts. If only low temperatures are necessary, metal materials can also be used.

The particle sizes of the ceramic and metal powders can be adjusted simultaneously by the following three methods:
Setting a given proportion of reaction gases to inert gases,
Setting a given pressure, and
Setting a given pressure and residence time profile along the reactor axis.

The temperature and residence time profile is set as follows:
By two or more heating zones from the beginning of the gas preheater 2 to the end of the tubular reactor 4,
By varying the reactor cross-section along its longitudinal axis,
By varying the gas flow rates and consequently the flow speeds for a given reactor cross-section.

Advantageously in the case of the last-mentioned possibility in particular, the reaction tube according to the invention is made interchangeable. Preferably the reaction tube comprises a number of individual segments which can vary in internal shape.

Particularly preferably, the individual segments are disposed so as to obtain a continuous variation in cross-section.

Figure 4:
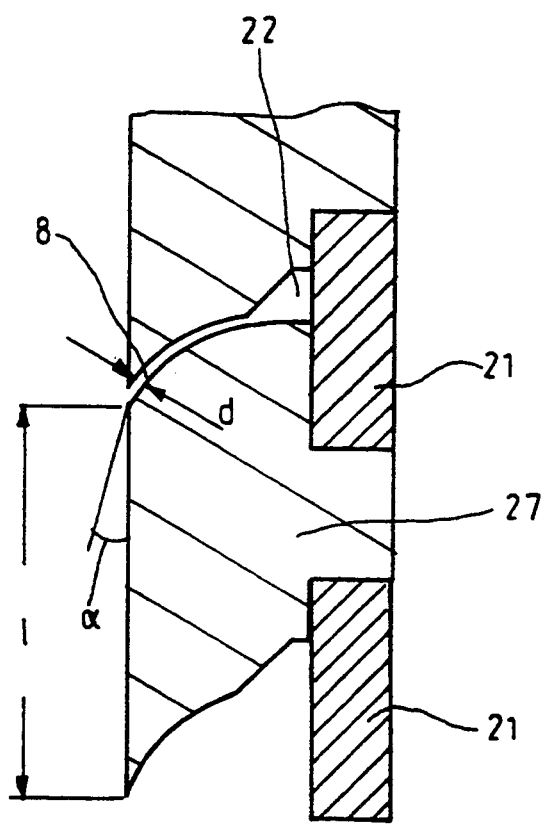
FIG. 4 shows a particularly advantageous embodiment of the invention.

In a particularly advantageous embodiment of the device according to the invention, the annular gaps are situated at the separating or connecting places between individual segments, as diagrammatically shown in FIG. 4.

The individual segments are interconnected by a spacing and centering device 21.

The spacing and centering device 21 is formed with openings so that the gas for scavenging the reactor wall can enter the gas distribution chamber 22, where a uniform annular flow initially forms and then flows through the annular gaps 8 into the reactor.

The thickness d of the annular gaps 8 must be within very narrow tolerances in accordance with the flow laws. To keep the scavenging gas close to the reactor wall, the entry angle $\alpha$ in accordance with the flow laws should be less than 5°.

The spacing and centering device 21 may be either a separate ring or a component, preferably of one of the segments to be joined together.

One important advantage of variability of the temperature and residence time profile according to the invention is that the nucleation zone can be uncoupled from the nucleus growth zone. It is thus possible according to the invention to produce "coarse" powder (i.e. in the range from about 0.1 μm to about 3 μm for TiN) at very low temperatures and with a short residence time (i.e. a small reactor cross-section for a given length) by allowing only a few nuclei to form, so that they can then grow into "coarse" particles at a high temperature and after a long residence time (large reactor cross-section). Alternatively "fine" powder (e.g. in the range from about 3 nm to about 100 nm in the case of TiN) can be produced as follows: a very large number of nuclei are formed in a region of high temperature and relatively long residence time, and then grow only slightly in the rest of the reactor at low temperatures and a short residence time (smaller reactor cross-section). All transitions are possible between the limiting cases, shown here qualitatively.

The powder, which in some cases is very air-sensitive or pyrophoric, can be passivated in the cooling vessel 12 by blowing in a suitable gas/vapour mixture. The particle surfaces of these ceramic powders can be coated with an oxide layer of defined thickness or with suitable organic compounds such as higher alcohols or amines or sintering aids such as paraffins in an inert stream of carrier gas. The coating can also be applied with a view to subsequent processing of the powders.

The oxide layers can be applied e.g. in a stream of inert gas and air, moistened to a defined extent, or in a stream of inert gas and $CO_2$ (preferred for carbides).

The invention will now be additionally explained by way of example without limitation thereby.

Example 1

TiN was prepared in accordance with the equation

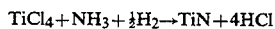

$$TiCl_4 + NH_3 + \tfrac{1}{2}H_2 \rightarrow TiN + 4HCl$$

in an apparatus as per FIGS. 1-4 [1, 2 and 3]; maintaining an excess of $NH_3$ and $H_2$.

To this end, 100 g/min of $TiCl_4$ (liquid, boiling point 136° C.) was introduced into the evaporator 1, evaporated and heated to 800° C. together with 50 Nl/min $N_2$. This gas mixture was conveyed to the gas preheater 2a. The reactants $H_2$ (200 Nl/min) and $NH_3$ (95 Nl/min) were introduced into the gas preheater 2. The reactants were separately preheated to a temperature of about 1000° C. The temperature was measured by a W5Re-W26Re thermocouple 18 at the place shown in FIG. 1 (1175° C.). Before entering the reaction tube 4, the turbulent individual filaments of flow coming out of the gas preheaters 2 were converted in the outer part of the nozzle 5 into a homogeneous axially symmetrical laminar annular flow. The stream of gas coming from the gas preheater 2a was also made laminar in the nozzle 5 and introduced into the annular flow. The nozzle 5 consisted of three coaxial component nozzles. A stream of inert gas 16 came out of the central component nozzle so as to move the place where the reaction began, i.e. the meeting of the two component streams 6 and 7, away from the nozzle and into the reaction tube. A Kármán vortex path was produced in the inner filament by an obstacle 17 having a characteristic measurement of 3.0 mm (disposed along the longitudinal axis of the nozzles). The reaction tube had a total length of 1100 mm and an inner diameter of 40 mm at the nozzle outlet, 30 mm at 200 mm below the nozzle, and 50 mm at the outlet of the tube. The inner cross-section was continuously varied in accordance with the flow laws. The reaction tube 4 was made up of 18 segments 27, connected by respective spacer and sensing rings 21. At each of these places, an annular gap 8 was formed. The temperature of the reaction tube was set by the W5Re-W26Re thermocouple 19 at 1080° C., measured at the outer wall of the reactor, 400 mm underneath the nozzle. The pressure in the reaction tube 4 was practically identical with the pressure in the blow-back filter 10, i.e. 250 mbar excess pressure. The reactor wall was scavenged with 200 Nl/min $N_2$ through 18 annular gaps 8. If the reactor wall is not scavenged with an inert gas, deposits may form and in some cases may very rapidly block the reactor and stop the process. In any case, owing to the change in the reactor geometry, there will be a change in the product. To reduce the HCl partial pressure, 200 Nl/min of $N_2$ were blown into the reaction tube through the sixth annular gap from the bottom, through an additional gas introduction device. The product (TiN having a uniform particle size of about 10 nm) was separated from the gases ($H_2$, $NH_3$, HCl, $N_2$) in the blow-back filter 10 at a temperature of 600° C. The temperature was chosen on the one hand to prevent the formation of $NH_4Cl$ (above 350° C.) and on the other hand to maintain the primary coating of HCl on the very large particle surface area (115 m²/g) at a low level (about 1.5% Cl).

The resulting TiN (i.e. 1300 g) was collected in the blow-back filter for 40 minutes and then transferred to the evacuating container 11. In this container, 8 pump flood cycles were run through in 35 minutes, the final pressures being 0.1 mbar abs. On each occasion, the container was flooded with Ar up to a pressure of 1100 mbar abs. After 35 minutes, the thus-treated TiN powder was transferred to the cooling container 12. In this container, the surface can also be tailored by blowing in various gas and vapour mixtures. After the powder had cooled to <50° C., it was transferred to the collecting and despatch container through the lock 13 without contact with the external air.

The pyrophoric TiN powder had a specific BET surface area of 115 m²/g, measured by the N₂-1-point method (DIN 66 131) and corresponding to 10 nm, and an extremely narrow particle distribution.

An REM photograph of this TiN powder, which had a specific surface area of 115 m²/g, showed the very narrow distribution of particle dimensions and the absence of excessively large grains. Less than 1% of the individual particles deviated by more than 10% and no individual particles deviated by more than 40% from the average particle size. In the present state of measurement technology, reliable information about the particle size distribution of such fine powders can be obtained only by picture-generating methods (e.g. REM or TEM).

Analysis of this TiN powder showed an oxygen content of 95 ppm and the sum of the non-oxide impurities was 800 ppm.

Example 2

TiN was prepared in accordance with the equation $$TiCl_4 + NH_3 + \tfrac{1}{2}H_2 \rightarrow TiN + 4HCl$$

in an apparatus as per FIGS. 1–4 [1, 2 and 3]; maintaining an excess of $NH_3$ and $H_2$.

To this end, 100 g/min of TiCl₄ (liquid, boiling point 136 C.) was introduced into the evaporator 1 evaporated and heated to 950° C. together with 50 Nl/min N₂. This gas mixture was conveyed to the gas preheater 2a. The reactants H₂ (200 Nl/min) and NH₃ (95 Nl/min) were introduced into the gas preheater 2. The reactants were separately preheated to a temperature of about 700° C. The temperature was measured by a W5Re-W26Re thermocouple 18 at the place shown in FIG. 1 (850° C.). Before entering the reaction tube 4, the turbulent individual filaments of flow coming out of the gas preheaters 2 were converted in the outer part of the nozzle 5 into a homogeneous axially symmetrical, laminar annular flow. The stream of gas coming from the gas preheater 2a was also made laminar in the nozzle 5 and introduced into the annular flow. The nozzle 5 consisted of three coaxial component nozzles. A stream of inert gas 16 came out of the central component nozzle so as to move the place where the reaction began, i.e. the meeting of the two component streams 6 and 7, away from the nozzle and into the reaction tube. A Kármán vortex path was produced in the inner filament by an obstacle 17 having a characteristic measurement of 4.0 mm (disposed along the longitudinal axis of the nozzles). The reaction tube had a total length of 1320 mm and an inner diameter of 25 mm at the nozzle outlet, 48 mm at between 120 mm and 180 mm underneath the nozzle, and 65 mm at the outlet of the tube. The inner cross-section was continuously varied in accordance with the flow laws. The reaction tube 4 was made up of 22 segments 27, connected by respective spacer and sensing rings 21. At each of these places, an annular gap 8 was formed.

The temperature of the reaction tube 4 was set by the W5Re-W26Re thermocouple 19 at 1570° C., measured at the outer wall of the reactor, 400 mm underneath the nozzle. The pressure in the reaction tube 4 was practically identical with the pressure in the blow-back filter 10, i.e. 250 mbar excess pressure. The reactor wall was scavenged with 200 Nl/min N₂ through 22 annular gaps 8. If the reactor wall is not scavenged with an inert gas, deposits may form and in some cases may very rapidly block the reactor and stop the process. In any case, owing to the change in the reactor geometry, there will be a change in the product. To reduce the HCl partial pressure, 200 Nl/min of Ar were blown into the reaction tube 4 through an additional annular gap in the sixth segment from the bottom, through an additional gas introduction device. The product (TiN having a uniform particle size of about 50 nm) was separated from the gases (H₂, NH₃, HCl, N₂) in the blow-back filter 10 at a temperature of 600° C.

The temperature was chosen on the one hand to prevent the formation of NH₄Cl (above 350° C.) and on the other hand to maintain the primary coating of HCl on the very large particle surface area (41.5 m²/g) at a low level (about 1% Cl).

The resulting TiN (i.e. 1300 g) was collected in the blow-back filter for 40 minutes and then transferred to the evacuating container 11. In this container, 8 pump flood cycles were run through in 35 minutes, the final pressures being 0.1 mbar abs. On each occasion, the container was flooded with Ar up to a pressure of 1100 mbar abs. After 35 minutes, the thus-treated TiN powder was transferred to the cooling container 12. In this container, the surface can also be tailored by blowing in various gas and vapour mixtures. After the powder had cooled to <50° C., it was transferred to the collecting and despatch container through the lock 13 without contact with the external air.

The pyrophoric TiN powder had a specific BET surface area of 41.5 m²/g, measured by the N₂-1-point method (DIN 66 131) and corresponding to 50 nm, and an extremely narrow particle distribution.

An REM photograph of this TiN powder, which had a specific surface area of 41.5 m²/g, showed the very narrow distribution of particle dimensions and the absence of excessively large grains. Less than 1% of the individual particles deviated by more than 10% and no individual particles deviated by more than 40% from the average particle size. In the present state of measurement technology, reliable information about the particle size distribution of such fine powders can be obtained only by picture-generating methods (e.g. REM or TEM).

Analysis of this TiN powder showed an oxygen content of 70 ppm and the sum of the non-oxide impurities was 820 ppm.

Example 3

TiC was prepared in accordance with the equation $$TiCl_4 + CH_4 \rightarrow TiC + 4HCl$$

in an apparatus as per FIGS. 1–4 [1, 2 and 3]; maintaining a slight excess of CH₄ and adding additional H₂.

To this end, 90 g/min TiCl₄ (liquid, boiling point 136° C.) was introduced into the evaporator 1a, evaporated and heated to 1200° C. together with 50 Nl/min Ar in the gas preheater 2a. The reactants H₂ (170 Nl/min) and CH₄ (25 Nl/min) were introduced into the gas preheater 2. The reactants were separately preheated to a temperature of about 1050° C. The temperature was measured by a W5Re-W26Re thermocouple 18 at the place marked in FIG. 1 (1200° C.). Before entering the reaction tube 4, the turbulent individual filaments of flow coming out of the gas preheaters 2 were converted in the outer part of nozzle 5 into a homogeneous axially symmetrical, laminar annular flow. The gas stream coming from the gas preheater 2a was likewise made laminar in the nozzle 5 and introduced into the annular flow. A Kármán vortex path was produced in the central flow filament by means of an obstacle 17 having a characteristic dimension of 4.0 mm along the longitudinal axis of the nozzle. The reaction tube had a total length of 1320 mm and a diameter of 25 mm at the nozzle outlet, widening to 48 mm between 120 and 180 mm underneath the nozzle. At the outlet of the tube, the diameter was 65 mm. The inner cross-section was continuously varied to allow for the flow laws. The reaction tube 4 was made up of 22 segments, each connected by a spacing and centering ring. At each of these places, an annular gap 8 was formed.

The temperature of the reaction tube 4 was set by the W5Re-W26Re thermocouple 19 at 1700° C., measured at the outer wall of the reactor, 400 mm underneath the nozzle. The pressure in the reaction tube 4 was practically identical with the pressure in the blow-back filter 10, i.e. 250 mbar excess pressure. The reactor wall was scavenged with 200 Nl/min Ar through 22 annular gaps 8. If the reactor wall is not scavenged with an inert gas, deposits can form and may in some cases very quickly block the reactor and stop the process; in any case, owing to the change in the reactor geometry, there is a change in the product. To reduce the HCl partial pressure, 200 Nl/min Ar was blown into the reaction tube 4 through an additional annular gap in the sixth segment from below, using an additional gas-introducing device. The product (TiC having a uniform particle size of about 50 nm) was separated from the gases $H_2$, $CH_4$, HCl, Ar in the blow-back filter 10 at a temperature of 600° C.

This temperature was chosen in order to maintain the primary coating of HCl on the very large particle surface area (45.6 $m^2/g$) at a low level (about 1% Cl).

The resulting TiC (i.e. 1300 g) was collected in the blow-back filter for 40 minutes and then transferred to the evacuating container 11. In this container, 8 pump flood cycles were run through in 35 minutes, the final pressure being 0.1 mbar abs. In each case the container was flooded with Ar up to a pressure of 1100 mbar abs. After 35 minutes, the thus-treated TiC powder was transferred to the cooling container 12, where surface tailoring is also possible by blowing in various gas and vapour mixtures. After the powder had cooled to below 50° C., it was transferred to the collecting and despatch container through the lock 13 without contact with the outer air.

The pyrophoric TiC powder had a specific BET surface area of 45.6 $m^2/g$, measured by the $N_2$-1-point method (DIN 66 131) corresponding to 10 nm, and an extremely narrow particle distribution.

An REM photograph of this TiC powder, which had a specific surface area of 45.6 $m^2/g$, showed the very narrow distribution of particle dimensions and the freedom from excessively large grains. Less than 1% of the individual particles deviated by more than 10% and no individual particles deviated by more than 40% from the average particle size. In the present state of measurement technology, reliable information about the particle size distribution of such extremely fine powder can be obtained only by picture-generating methods (e.g. REM or TEM).

Analysis of this TiC powder gave an oxygen content of 80 ppm and a total of 890 ppm of non-oxide impurities.

Example 4

Ta was produced in accordance with the equation $$TiCl_5 + 2\tfrac{1}{2}H_2 \rightarrow Ta + 5HCl$$

in an apparatus as per FIGS. 1–4 [1, 2 and 3]; maintaining an excess of $H_2$.

To this end, 100 g/min $TaCl_5$ (solid, boiling point 242° C.) was introduced into the evaporator 1a, evaporated and heated together with 50 Nl/min Ar to 1300° C. in the gas preheater 2a. The reactant $H_2$ (200 Nl/min) was introduced into the gas preheater 2. The reactants were separately heated to a temperature of about 1300° C. The temperature (1450° C.) was measured by a W5Re-W26Re thermocouple 18 at the place marked in FIG. 1. Before entering the reaction tube 4, the turbulent individual filaments of flow coming from the gas preheaters 2 were convened in the outer part of nozzle 5 into a homogeneous axially symmetrical laminar annular flow. The gas flow coming out of the preheater 2a was likewise made laminar in the nozzle 5 and introduced into the annular flow. The nozzle 5 consisted of three coaxial component nozzles. A stream of inert gas 16 came out of the central component nozzle and displaced the beginning of the reaction, i.e. the place where the two component flows 6 and 7 met, from the nozzle and into the reaction tube. A Kármán vortex path was produced in the inner filament by the obstacle 17, which had a characteristic dimension of 3.0 mm (disposed along the longitudinal axis of the nozzle). The tubular reactor had a total length of 1100 mm and an inner diameter of 40 mm at the nozzle outlet, 30 mm at 200 mm below the nozzle and 50 mm at the outlet of the tube. The inner cross-section was continuously altered, allowing for the flow laws. The reaction tube 4 was made up of 18 segments 27, joined by respective spacing and centering rings 21. At each joint, an annular gap 8 was formed. The temperature of the reaction tube 4 was set by the W5Re-W26Re thermocouple 19 at 1230° C., measured at the outer wall of the reactor and 400 mm below the nozzle. The pressure in the reaction tube 4 was practically identical with the pressure in the blow-back filter 10, i.e. 250 mbar excess pressure. The reactor wall was scavenged with 200 Nl/min of Ar through 18 annular gaps 8. If the reactor wall is not scavenged with an inert gas, deposits can form and in some cases will very rapidly block the reactor and thus stop the process; in any case, owing to the change in the reactor geometry, there will be a change in the product. To reduce the partial pressure of HCl, 200 Nl/min Ar were blown into the reaction tube 4 through the sixth annular gap from the bottom, using an additional gas-introducing device. The product (Ta with a uniform particle size of about 25 nm) was separated from the gases ($H_2$ HCl, Ar) in the blow-back filter 10 at a temperature of 600° C.

This temperature was chosen in order to keep the primary coating of HCl on the very large particle surface areas (18 $m^2/g$) at a low level (about 0.8% Cl).

The thus-produced Ta (i.e. 2000 g) was collected in the blow-back filter for 40 minutes and then transferred to the evacuating container 11. In this container, 8 pump flood cycles were run through in 35 minutes, the final pressure being 0.1 mbar abs. In each case the container was flooded with Ar up to a pressure of 1100 mbar abs. After 35 minutes, the thus-treated Ta powder was transferred to the cooling container 12, where surface tailoring is also possible by blowing in various gas/vapour mixtures. After the powder cooled to below 50° C., it was transferred to the collecting and despatch container through the lock 13 without contact with the outer air.

The pyrophoric Ta powder had a specific BET surface area of 17 m$^2$/g, measured by the N$_2$-1-point method (DIN 66 131) and corresponding to 25 nm, and an extremely narrow particle distribution.

An REM photograph of this Ta powder, which had a specific surface area of 25 m$^2$/g, showed the very narrow distribution of particle dimensions and the absence of excessively large grains. Less than 1% of the individual particles deviated more than 10% and no individual particles deviated more than 40% from the average particle size. In the present state of measurement technology, reliable information about the particle size distribution of such extremely fine powders can be obtained only by picture-generating methods (e.g. REM or TEM).

Analysis of this Ta powder showed an oxygen content of 70 ppm and the sum of the non-oxide impurities was 430 ppm.

Example 5

Nb$_2$O$_5$ was prepared in accordance with the equation

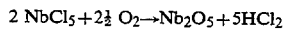
$$2\ NbCl_5 + 2\tfrac{1}{2}\ O_2 \rightarrow Nb_2O_5 + 5HCl_2$$

in an apparatus as per FIGS. 1-4 [1, 2 and 3]. Excess air was used as the oxygen carrier.

To this end 100 g/min of NbCl$_5$ (solid, boiling point 254° C.) was introduced into the evaporator 1a, evaporated and heated together with 50 Nl/min N$_2$ to 1250° C. in the gas preheater 2a. The air (400 Nl/min) was introduced into the gas preheater 2. The reactants were separately preheated to a temperature of about 1200° C. The temperature was measured by means of a W5Re-W26Re thermocouple 18 at the place marked in FIG. 1 (1450° C.). Before entering the reaction tube 4, the turbulent individual filaments of flow coming out of the gas preheaters 2 were converted in the outer part of the nozzle 5 into a homogeneous, axially symmetrical laminar annular flow. The stream of gas coming from the preheater 2a was likewise made laminar in the nozzle 5 and introduced into the annular flow. The nozzle 5 consisted of three coaxial component nozzles. A stream of inert gas 16 came out of the central component nozzle and displaced the beginning of the reaction, i.e. the place where the two partial flows 6 and 7 met, from the nozzle into the reaction tube. In the inner filament of flow, a Kármán vortex path was generated by an obstacle 17 having a characteristic dimension of 4.0 mm (disposed along the longitudinal axis of the nozzle). The reaction tube had a total length of 1100 mm and an inner diameter of 45 mm at the nozzle outlet and 30 mm at 200 mm below the nozzle. After widening to 90 mm (at 290 mm below the nozzle), the inner diameter at the tube outlet was 105 mm.

The inner diameter was continuously altered, allowing for the flow laws. The reaction tube 4 was made up of 18 segments 27, connected by respective spacer and centering rings 21. At each of these places, an annular gap 8 was formed.

The nozzle 5, the reaction tube 4 and the heat exchanger 2 were made of oxide ceramic. The heat exchanger 2a was made of coated graphite. The considerable widening of the reactor cross-section was necessary in order to obtain a long residence time so that the by-product NbO$_2$Cl could also be converted to Nb$_2$O$_5$.

The temperature of the reaction tube 4 was set at 1300° C. by the W5Re/W26Re thermocouple 19, as measured at the outer wall of the reactor, 400 mm below the nozzle. The pressure in the reaction tube 4 was practically identical with the pressure in the blow-back filter 10, i.e. 250 mbar excess pressure. The reactor wall was scavenged with 200 Nl/min N$_2$ through 18 annular gaps 8. If the reactor wall is not scavenged with an inert gas, deposits can form and in some cases can very rapidly block the reactor and stop the process. In any case, owing to the changing reactor geometry, there is a change in the product. To reduce the Cl$_2$ partial pressure, an additional gas-introducing device blew 200 Nl/min N$_2$ into the reaction tube 4 through the sixth annular gap from below. The product (Nb$_2$O$_5$ having a uniform particle size of about 45 nm) was separated from the gases (Cl$_2$, N$_2$) in the blow-back filter 10 at a temperature of 600° C.

This temperature was chosen to keep the primary coating of Cl$_2$ on the very large particle surfaces (42 m$^2$/g) to a low level.

The resulting Nb$_2$O$_5$ (e.g. 1950 g) was collected in the blow-back filter for 40 minutes and then transferred to the evacuating container 11. In this container, eight pump flood cycles were run through in 35 minutes, the end pressures being 0.1 mbar abs. On each occasion, the container was flooded with Ar up to a pressure of 1100 mbar. After 35 minutes the thus-treated Nb$_2$O$_5$ powder was transferred to the cooling container 12, where the surface can be tailored by blowing in various gas/vapour mixtures. After the powder cooled to below 50° C., it was transferred to the collecting and despatch container through the lock 13 without contact with the external air.

The Nb$_2$O$_5$ powder had a specific BET surface area of 42 m$^2$/g, measured by the N$_2$-1-point method (DIN 66 131) and corresponding to 45 nm, and an extremely narrow particle distribution.

An REM photograph of this Nb$_2$O$_5$ powder, which had a specific surface area of 42 m$^2$/g, showed the very narrow distribution of particle dimensions and the freedom from excessively large grains. Less than 1% of the individual particles deviated by more than 10% and no individual particles deviated by more than 40% from the average size. In the present state of measurement technology, reliable information about a particle size distribution of such extremely fine powder can be obtained only by picture-generating methods (e.g. REM or TEM).

Analysis of this Nb$_2$O$_5$ powder showed that the sum of the metal impurities was 700 ppm.

What is claimed is:

1. A gas phase reactor for producing at least one of fine-divided metal and ceramic powder, comprising a gas preheater, a gas-introduction part, a flow-shaping part comprising at least two coaxially disposed reaction-gas nozzles and at least one inert gas nozzle disposed between the reaction-gas nozzles, a reaction tube and a product discharge device, wherein the gas preheater comprises at least two separate gas heaters.

2. A gas phase reactor according to claim 1, wherein the at least one inert gas nozzle is disposed coaxially with the reaction gas nozzles.

3. A gas phase reactor for producing at least one of finely-divided metal and ceramic powder, comprising a gas preheater, a gas-introduction part, a flow-shaping part, a reaction tube and a product discharge device, wherein the gas preheater comprises at least two separate gas heaters and said reaction tube has gas-introducing devices disposed therein, further wherein the gas-introducing devices in said reaction tube are annular gaps.

4. A gas phase reactor for producing at least one of finely-divided metal and ceramic powder, comprising a gas preheater, a gas-introduction part, a flow-shaping part, a reaction tube and a product discharge device, wherein the gas preheater comprises at least two separate gas heaters and the reaction tube comprises a number of individual segments, further wherein one or more gas-introducing devices are disposed in the reaction tube and the gas-introducing devices are annular gaps located at the separating or connecting places between the individual segments of the reaction tube.

5. Gas phase reactor according to claim 4, wherein the inner wall of said reaction tube has longitudinal grooves with intermediate spacings and depths in the order of 0.1 mm.

6. Gas phase reactor according to claim 5, wherein the annular gaps also have longitudinal grooves.

* * * * *

UNITED STATES PATENT AND TRADEMARK OFFICE
CERTIFICATE OF CORRECTION

PATENT NO. : 5,356,120
DATED : October 18, 1994
INVENTOR(S) : Theo Konig, et al.

It is certified that error appears in the above-indentified patent and that said Letters Patent is hereby corrected as shown below:

Column 14, line 56, "fine-divided" should be --finely-divided--.

Column 16, line 6, "claim 4," should be --claim 3,--.

Signed and Sealed this

Twenty-second Day of August, 1995

BRUCE LEHMAN

Attest:

Attesting Officer       Commissioner of Patents and Trademarks